(12) United States Patent
Slawkowski

(10) Patent No.: US 11,744,187 B2
(45) Date of Patent: Sep. 5, 2023

(54) DEVICES AND METHODS FOR HANGING ITEMS

(71) Applicant: Leonica M. Slawkowski, St. John, IN (US)

(72) Inventor: Leonica M. Slawkowski, St. John, IN (US)

( * ) Notice: Subject to any disclaimer, the term of this patent is extended or adjusted under 35 U.S.C. 154(b) by 0 days.

(21) Appl. No.: 17/835,102

(22) Filed: Jun. 8, 2022

(65) Prior Publication Data

US 2022/0386538 A1    Dec. 8, 2022

Related U.S. Application Data

(60) Provisional application No. 63/208,235, filed on Jun. 8, 2021.

(51) Int. Cl.
*F16B 2/08* (2006.01)
*A01G 5/04* (2006.01)
*F16M 13/02* (2006.01)

(52) U.S. Cl.
CPC ........... *A01G 5/04* (2013.01); *F16B 2/08* (2013.01); *F16M 13/02* (2013.01)

(58) Field of Classification Search
CPC . A01G 5/04; F16B 2/08; F16M 13/02; F16M 11/22; F16M 13/022; F16M 11/041; A47G 25/0614; A47G 7/047
USPC ........................................................ 248/304
See application file for complete search history.

(56) References Cited

U.S. PATENT DOCUMENTS

| | | | |
|---|---|---|---|
| 2,969,947 A | | 1/1961 | Tonnesson |
| 4,309,019 A | * | 1/1982 | Bloom .................... F16M 13/02 248/610 |
| D338,827 S | * | 8/1993 | Rumble ......................... D8/380 |
| 5,577,698 A | | 11/1996 | Liu et al. |
| D559,084 S | * | 1/2008 | Foxx .............................. D8/356 |
| D848,826 S | | 5/2019 | Williams |
| 2012/0280094 A1 | | 11/2012 | Post |
| 2020/0128758 A1 | * | 4/2020 | Pestl ........................ A01G 5/04 |

\* cited by examiner

*Primary Examiner* — Terrell L McKinnon
*Assistant Examiner* — Jerry Olivier
(74) *Attorney, Agent, or Firm* — Hartman Global IP Law; Gary M. Hartman; Domenica N. S. Hartman

(57) ABSTRACT

Devices and methods suitable for hanging items. Such a device includes a body having spaced-apart legs interconnected by a bridge section, protrusions extending from a distal end of each leg opposite the bridge section and defining a recess in the distal end of each of the leg, a hole in each leg adjacent the distal end thereof, and fasteners each configured to be secured to a corresponding one of the legs such that the fastener defines a loop that passes through the hole, extends along a first face of the leg, passes within and around the recess between the protrusions, and extends to a second face of the leg opposite the first face. The fasteners are configured to secure an item between the fasteners and the corresponding legs, and the bridge section is spaced apart from the holes in the legs to define a niche for receiving an object.

14 Claims, 3 Drawing Sheets

DEVICES AND METHODS FOR HANGING ITEMS

CROSS-REFERENCE TO RELATED APPLICATIONS

This application claims the benefit of U.S. Provisional Application No. 63/208,235 filed Jun. 8, 2021, the contents of which are incorporated herein by reference.

BACKGROUND OF THE INVENTION

The present invention generally relates to devices for hanging items. The invention particularly relates to devices for hanging items that include a structural member in the form of a strand or wire, including but not limited to a wreath that comprises a wire frame.

BRIEF DESCRIPTION OF THE INVENTION

The present invention provides devices and methods suitable for hanging items.

According to one aspect of the invention, a device is provided that includes a body having spaced-apart legs coupled or otherwise interconnected by a bridge section, protrusions extending from a distal end of each of the legs opposite the bridge section and defining a recess in the distal end of each of the leg, a hole in each of the legs adjacent the distal ends thereof, and fasteners each configured to be secured to a corresponding one of the legs such that each fastener defines a loop that passes through the hole, extends along a first face of the leg, passes within and around the recess between the protrusions, and extends to a second face of the leg opposite the first face. The fasteners are configured to secure an item between the fasteners and the corresponding legs, and the bridge section is spaced apart from the holes in the legs to define a niche for receiving an object.

Other aspects of the invention include methods of hanging an item with devices having features such as those described above. Such methods are particularly directed to hanging an item that includes a structural member in the form of a strand or wire, including but not limited to a wreath that comprises a wire frame.

Technical effects of the device and methods described above preferably include the ability to promote ease of hanging items.

Other aspects and advantages of this invention will be appreciated from the following detailed description.

DETAILED DESCRIPTION OF THE INVENTION

Figure 1:
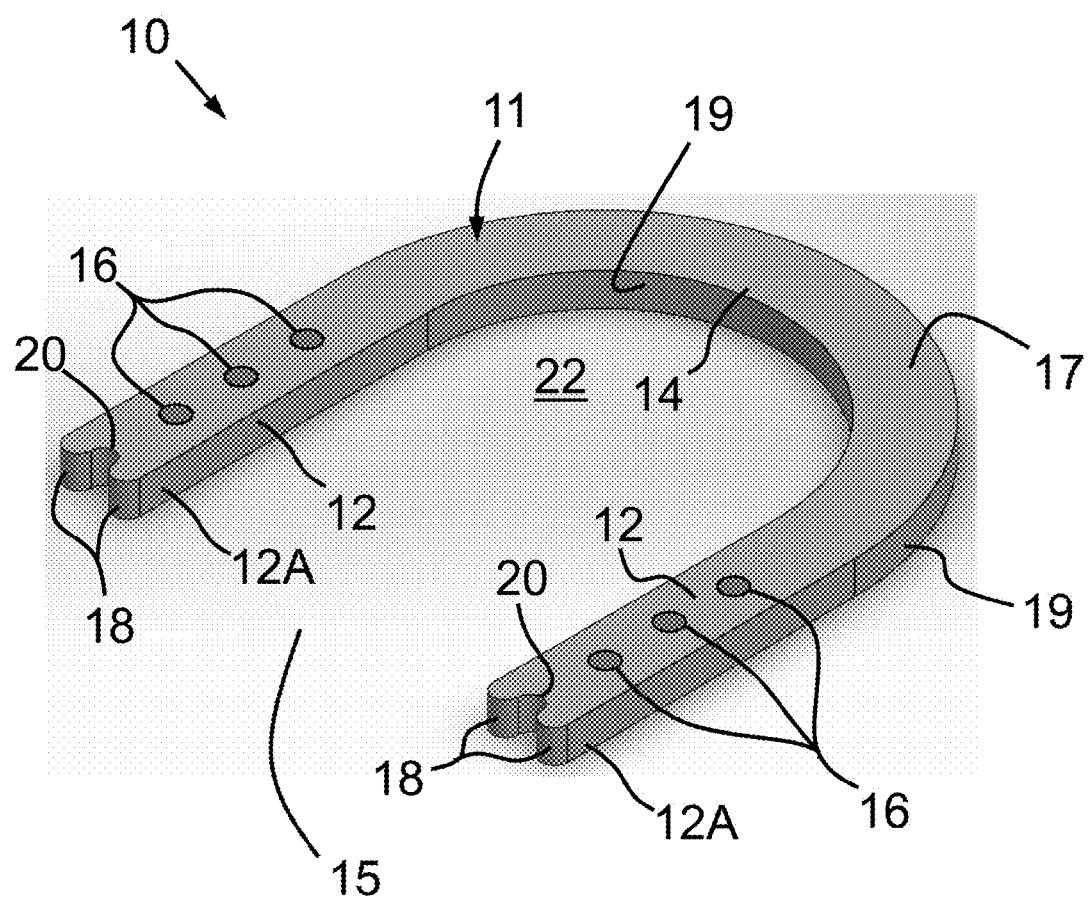
FIG. 1 schematically represents a perspective view of a device configured for hanging items in accordance with certain nonlimiting aspects of the invention.

The intended purpose of the following detailed description of the invention and the phraseology and terminology employed therein is to describe what is shown in the drawings, which include the depiction of a nonlimiting embodiment of the invention, and to describe certain but not all aspects of what is depicted in the drawings, including the embodiment depicted in the drawings. The following detailed description also identifies certain but not all alternatives of the embodiment depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects described as part of different embodiments. Therefore, the appended claims, and not the detailed description, are intended to particularly point out subject matter regarded to be aspects of the invention, which may include certain but not necessarily all of the aspects and alternatives described in the detailed description.

Figure 2:
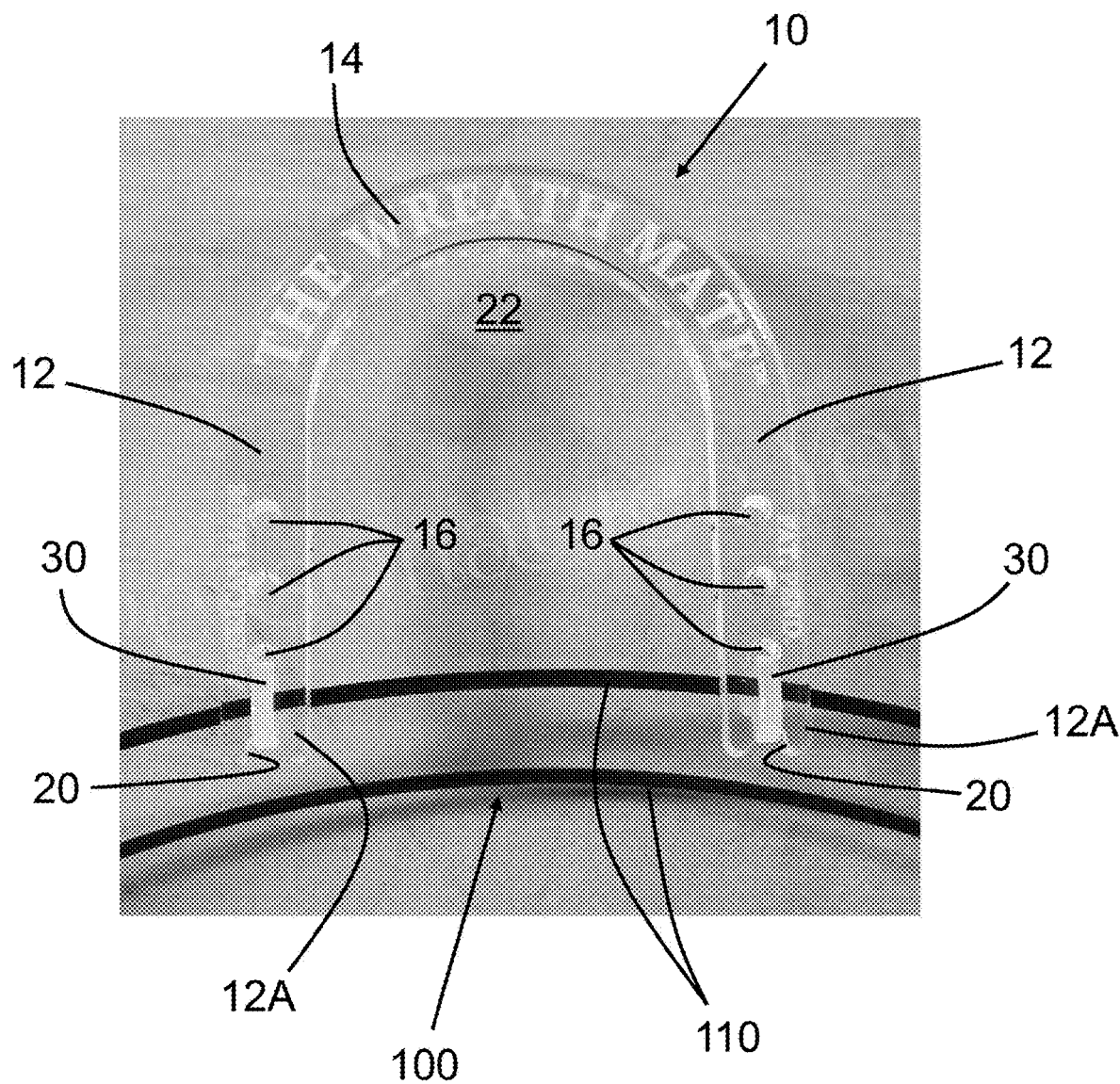
FIG. 2 represents a device of the type represented in FIG. 1, wherein the device is shown attached to a wreath frame with straps in accordance with a nonlimiting aspect of the invention.
Figure 3:
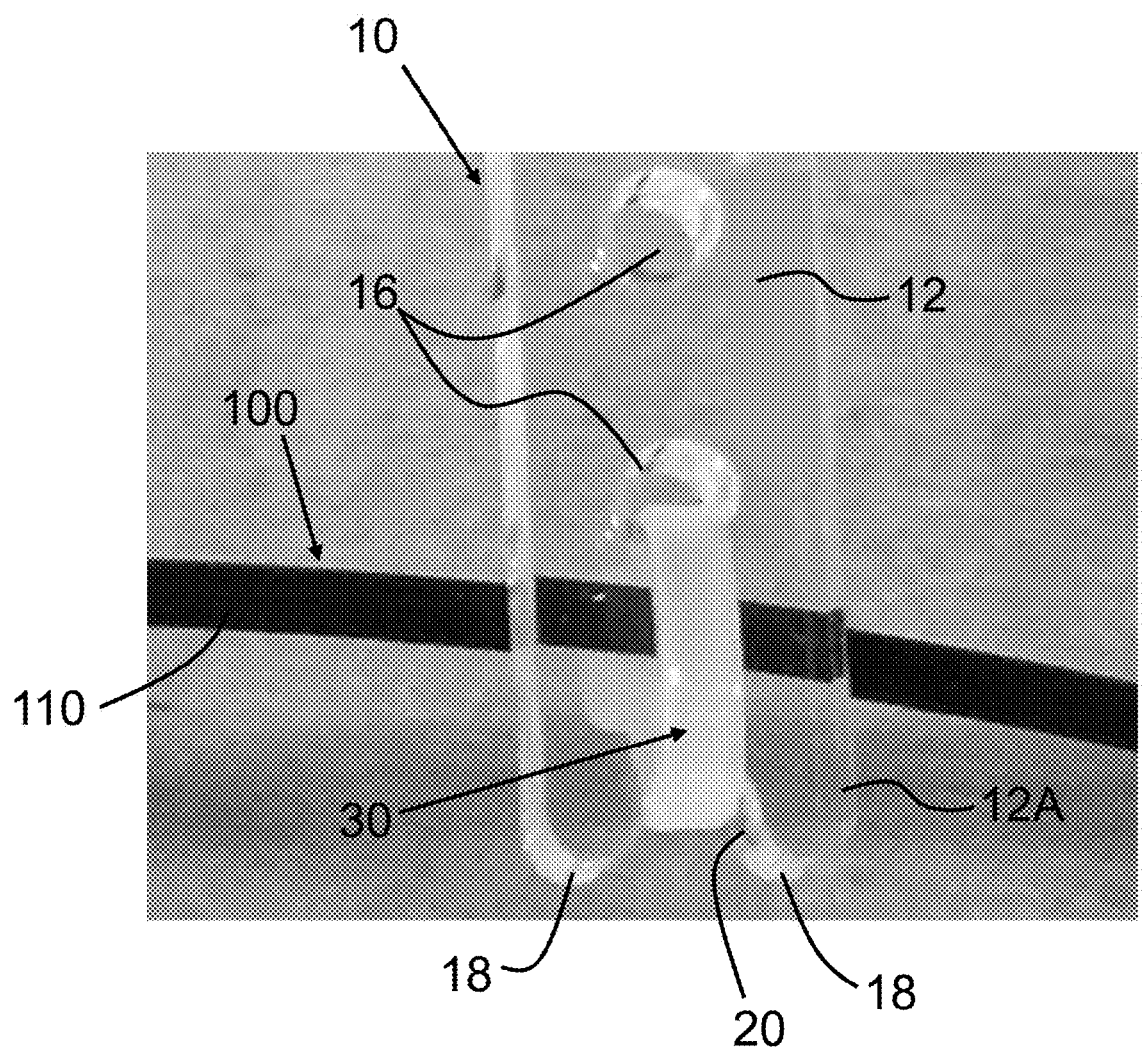
FIG. 3 represents a detailed view of the device of FIG. 2 showing the attachment of the device to the wreath frame with one of the straps.

FIGS. 1 through 3 represent a nonlimiting embodiment of a device 10 configured for hanging items. The device 10 is particularly configured for hanging a wide variety of items that include at least one structural member in the form of a strand or wire, such as the wire 110 depicted in FIGS. 2 and 3, notable but nonlimiting examples of which include wreaths that comprise a wire frame. The device 10 comprises a body 11 having legs 12 coupled or otherwise interconnected to each other by a bridge section 14. In the nonlimiting embodiment shown, the body 11 has a pair of the legs 12 that are parallel and spaced apart by the bridge section 14, which is represented as having a semicircular shape. The legs 12 are spaced apart to define a niche 22 at an end of the body 11 adjacent the bridge section 14 and the distal ends 12A of the legs 12 are spaced apart to define an opening 15 at an end of the body 11 opposite the bridge section 14. As a result, the embodiment of the body 11 represented in the drawings can be described as U-shaped or horseshoe-shaped. The body 11 is further represented as having a pair of oppositely-disposed and parallel faces 17 (one of which is labeled in FIG. 1) between which a side wall 19 of the body 11 is defined that is substantially perpendicular to the faces 17.

The body 11 further comprises holes 16 that extend therethrough between the faces 17 of the body 11. The holes 16 are spaced apart on and aligned along a central axis of each of the legs 12. The distal end 12A of each leg 12 defines a recess 20 between a pair of protrusions 18 that extend or protrude distally from the body 11. In the nonlimiting embodiment shown in the drawings, the recess 20 is defined by a forked or sinuous region of the side wall 19 of the body 11, such that both the recess 20 and the protrusions 18 are rounded. Though a single recess 20 between a single pair of protrusions 18 is shown, it is foreseeable that the body 11 could have more than one recess 20 defined between more than two protrusions 18 disposed at the distal end 12A of one or more of the legs 12.

The device 10 may be used in combination with one or more fasteners 30. As represented in FIGS. 2 and 3, an individual fastener 30 is preferably configured to be secured to and span between the recess 20 of one of the legs 12 and any one or more of the holes 16 of the same leg 12. Such fasteners 30 may include but are not limited to flexible, elongated fasteners such as polymer cable ties (also referred to as hose ties or zip ties), wires, and strings. In the nonlimiting embodiment shown, each fastener 30 passes through one of the holes 16, extends along a first of the faces 17 of the body 11 roughly along the central axis of the respective leg 12, passes within and around the recess 20 of the leg 12 between the protrusions 18 thereof, and is then secured at the second face 17 of the body 11, for example, by securing the fastener 30 to itself to form a loop. Preferably, once the fasteners 30 are coupled to the device 10, the perimeter of the completed loop defined by a fastener 30 is sufficiently small in relation to the distance between the recess 20 and the utilized hole 16 such that lateral movement of the fastener 30 relative to its leg 12 is restricted by the adjacent protrusions 18 thereby ensuring that the fastener 30 is retained within the recess 20.

The fasteners 30 may be used to secure various items to the device 10 by locating the item or a portion thereof adjacent one or both of the legs 12 between the recess 20 and at least one of the holes 16 thereof, and then using the fastener(s) 30 to secure the item to the leg(s) 12, so that the item or portion is between the leg(s) 12 and fastener(s) 30. Depending on the size of the device 10, the spacing between the recess 20 and holes 16 on each leg 12 can be particularly sized for securing an item with at least one structural member in the form of a strand or wire whose cross-section can be received between the recess 20 and at least one of the holes 16 of at least one of the legs 12. As a nonlimiting example, FIGS. 2 and 3 represent the device 10 secured to a frame 100 of a type used for a wreath. In this example, the frame 100 is a wire frame 100 that typically comprises a circular arrangement of wires 110, and each leg 12 of the device 10 is coupled to one of the wires 110 of the frame 100 with a fastener 30. In the nonlimiting example shown, the fasteners 30 are cable ties that retain the wire 110 between the fasteners 30 and both legs 12 of the device 10. While reference will be made in the following discussion of securing the wire 110 to the device 10, it should be understood that other structural members of various items can be secured in a similar manner, and that the terms "wire" and "strand" are used to generically refer to structural members whose cross-sections are less than their lengths.

In the nonlimiting embodiment shown in the drawings, the distal ends 12A of the legs 12 are configured to promote ease of securing the device 10 to the wire 110. For example, as a fastener 30 is coupled to and, if necessary, tightened to the device 10, the rounded or arcuate shape of the protrusions 18 are capable of directing the fastener 30 toward and into the recess 20 therebetween, thereby providing a self-aligning function that aligns each fastener 30 with the central axis of the leg 12 to which it is being mounted.

In order to hang an item coupled to one or both of the legs 12, the bridge section 14 may be located over an object such that the object is received in the niche 22 adjacent the bridge section 14, a portion of the side wall 19 of the body 11 located on the interior (in this case, concave) side of the bridge section 14 can be made to rest on the object, such that the device 10 and the item connected thereto can hang from the object. For example, the frame 100 of FIGS. 2 and 3 may be hung by locating the bridge section 14 of the device 10 over a hook, door handle, or other fixed, protruding object.

Movement of an item relative to the legs 12 may be restricted by the fasteners 30. For example, minimizing the perimeters of loops defined by the fasteners 30 between the distal ends 12A and the utilized holes 16 (e.g., constricting the fasteners 30) can be used to apply a compressive force to clamp the item or portion thereof (such as the wire 110) between the fasteners 30 and one or more legs 12 of the device 10. In addition, such restriction may be adjusted depending on which of the holes 16 is utilized by a fastener 30. For example, in FIGS. 2 and 3 the fasteners 30 are secured by utilizing the recesses 20 at the distal ends 12A of the legs 12 and the holes 16 closest to the distal ends 12A. In this case, because each fastener 30 spans a relatively short distance between the utilized hole 16 and the corresponding distal end 12A of a leg 12, the fasteners 30 are likely to provide maximum restriction of movement of the wire 110 (and the frame 100 as a whole) relative to the device 10. In contrast, the frame 100 can have increased freedom of movement if the fasteners 30 are instead secured by utilizing any of the holes 16 farther from the distal ends 12A of the legs 12. As such, it is believed that movement of an item relative to the legs 12 may be most limited by minimizing the perimeter of the loops defined by the fasteners 30 and utilizing the holes 16 that are closest to the distal ends 12A of the legs 12 and yet far enough from their respective recesses 20 to enable the cross-section of the wire 110 to be positioned between the utilized hole 16 and the recess 20.

From the above, it should be apparent that the device 10 can be preferably sized so that a portion of an item to be secured with the fasteners 30 should be capable of being accommodated between the recess 20 and at least one of the holes 16 of each leg 12. Furthermore, the legs 12 should be of sufficient length to place the bridge section 14 of the device 10 sufficiently far from the holes 16 to enable an object to be received in the niche 22 and the bridge section 14 to be utilized to hang the item from the object.

Alternative embodiments of the device 10 are foreseeable and within the scope of the invention. For example, the bridge section 14 may have a shape other than semicircular, such as but not limited to various linear, curved, arcuate, or pointed shapes configured to allow the bridge section 14 to be hung on an object. In addition, the legs 12 may be at angles relative to one another other than parallel, may not necessarily be linear, may have more or fewer holes 16, and/or may have holes 16 with shapes other than circular.

In yet another embodiment, the holes 16 may be omitted, and the fasteners 30 may be releasably or permanently fixed to one of the faces 17 of the body 11 disposed on the legs 12, wherein each fastener 30 is configured to be able to extend along its corresponding leg 12, through and around the recess 20 of the leg 12, and secured to or at the opposite face 17 of the leg 12. In such embodiments, one or both of the faces 17 may include a protrusion or component configured for securing the fasteners 30 to the legs 12.

As previously noted above, though the foregoing detailed description describes certain aspects of one or more particular embodiments of the invention, alternatives could be adopted by one skilled in the art. For example, the device 10 could differ in appearance and construction from the embodiment described herein and shown in the drawings, functions of certain components of the device 10 could be performed by components of different construction but capable of a similar (though not necessarily equivalent) function, and various materials could be used in the fabrication of the device 10 and/or its components. As such, and again as was previously noted, it should be understood that the invention is not necessarily limited to any embodiment described herein.

The invention claimed is:

1. A device comprising:
   a body having spaced-apart legs interconnected by a bridge section;
   protrusions extending from a distal end of each of the legs opposite the bridge section and defining a recess in the distal end of each of the legs;
   a hole in each of the legs adjacent the distal end thereof; and
   fasteners each configured to be secured to a corresponding one of the legs such that the fastener defines a loop that passes through the hole, extends along a first face of the leg, passes within and around the recess between the protrusions, and extends to a second face of the leg opposite the first face, the pair of fasteners configured to secure an item between the fasteners and the corresponding legs, wherein the bridge section is spaced apart from the holes in the legs to define a niche for receiving an object.

2. The device of claim 1, wherein the bridge section has a curved shape.

3. The device of claim 2, wherein the bridge section has a semicircular shape.

4. The device of claim 3, wherein the body is U-shaped.

5. The device of claim 4, wherein the protrusions and the recesses are rounded and define sinuous shapes at the distal ends of the legs.

6. The device of claim 1, wherein the protrusions and the recesses are rounded and define sinuous shapes at the distal ends of the legs.

7. The device of claim 1, further comprising at least one additional hole in each of the legs.

8. The device of claim 1, wherein each of the fasteners comprises a flexible, elongated body.

9. The device of claim 8, wherein the fasteners are cable ties.

10. The device of claim 1, wherein the protrusions are configured to restrict lateral movement of a corresponding one of the fasteners while the fastener is secured in a loop between the hole and the recess of a corresponding one of the legs.

11. The device of claim 1, wherein the fasteners secure the legs to a wreath.

12. A method of hanging an item with the device of claim 1, the method comprising:
 securing at least a first of the fasteners to a first of the legs such that the first fastener defines the loop thereof between and through the hole and around the recess of the first leg with the item located between the first fastener and the first leg; and
 locating the object within the niche adjacent the bridge section such that the bridge section rests on the object and the device and the item connected thereto hang from the object.

13. The method of claim 12, further comprising securing a second of the fasteners to a second of the legs such that the second fastener defines the loop thereof between and through the hole of the second leg and around the recess of the second leg with the item located between the second fastener and the second leg.

14. The method of claim 12, wherein each of the fasteners comprises a flexible, elongated body, wherein securing the first fastener to the first leg includes passing an end of the elongated body of the first fastener through the hole, extending the body along the first face of the first leg, passing the body within and around the recess between the protrusions, and extending the body along the second face of the first leg, around the item, and to the hole, and securing the body to itself to define the loop thereof.

* * * * *